US010909889B2

(12) United States Patent
Lee

(10) Patent No.: US 10,909,889 B2
(45) Date of Patent: Feb. 2, 2021

(54) DISPLAY DEVICE

(71) Applicant: Samsung Display Co., Ltd., Yongin-Si (KR)

(72) Inventor: Jungil Lee, Seoul (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/796,101

(22) Filed: Feb. 20, 2020

(65) Prior Publication Data
US 2020/0357310 A1    Nov. 12, 2020

(30) Foreign Application Priority Data

May 7, 2019  (KR) .................. 10-2019-0052892

(51) Int. Cl.
G09F 9/30      (2006.01)
G06F 1/16      (2006.01)

(52) U.S. Cl.
CPC ............ *G09F 9/301* (2013.01); *G06F 1/1616* (2013.01); *G06F 1/1681* (2013.01)

(58) Field of Classification Search
CPC combination set(s) only.
See application file for complete search history.

(56) References Cited

U.S. PATENT DOCUMENTS

| 8,369,075 | B2* | 2/2013 | Huang ................... G09F 9/375 361/679.21 |
| 8,606,340 | B2* | 12/2013 | Pegg ..................... G06F 1/1641 455/575.4 |
| 8,803,816 | B2* | 8/2014 | Kilpatrick, II ...... H04M 1/0247 345/173 |
| 8,836,611 | B2* | 9/2014 | Kilpatrick, II ........ G06F 1/1641 345/1.3 |
| 8,860,632 | B2* | 10/2014 | Kilpatrick, II ........ G06F 1/1654 345/1.3 |
| 8,860,765 | B2* | 10/2014 | Kilpatrick, II ........ G06F 1/1641 345/659 |
| 8,863,038 | B2* | 10/2014 | King ..................... G06F 1/1694 715/863 |

(Continued)

FOREIGN PATENT DOCUMENTS

| KR | 1020100092222 A | 8/2010 |
| KR | 1020150104407 A | 9/2015 |

(Continued)

*Primary Examiner* — Lisa Lea-Edmonds
(74) *Attorney, Agent, or Firm* — Cantor Colburn LLP

(57) ABSTRACT

A display device includes a display module including a display panel and a support member including a first surface facing a rear surface of the display panel and a second surface opposite to the first surface, and a guide unit disposed on the second surface of the support member. The display module includes first and second folding portions, a central portion disposed between the first and second folding portions and left and second display portions. The guide unit includes a rotation part overlapping the central portion, a first connection part connected to the rotation part, a second connection part connected to the rotation part, a wire part fixed to the first display portion and fixed to the second connection part, and an elastic part fixed to the second surface of the support member and fixed to the rotation part, the first connection part or the second connection part.

21 Claims, 17 Drawing Sheets

(56) References Cited

U.S. PATENT DOCUMENTS

| | | | | |
|---|---|---|---|---|
| 8,866,840 B2* | 10/2014 | Dahl | G06F 1/1616 | 345/619 |
| 8,933,874 B2* | 1/2015 | Lundqvist | G06F 3/1431 | 345/108 |
| 8,947,320 B2* | 2/2015 | King | G06F 1/1641 | 345/1.1 |
| 9,009,984 B2* | 4/2015 | Caskey | G06F 1/1677 | 33/355 R |
| 9,179,559 B1* | 11/2015 | Kim | G06F 1/1681 | |
| 9,572,272 B2 | 2/2017 | Lee | | |
| 9,779,653 B2* | 10/2017 | Ikeda | G09G 3/3208 | |
| 9,801,290 B2* | 10/2017 | Ahn | G06F 1/1652 | |
| 9,829,923 B2* | 11/2017 | Lee | G06F 1/1652 | |
| 9,891,663 B2* | 2/2018 | Park | G06F 3/0487 | |
| 10,303,218 B2* | 5/2019 | Jones | G06F 1/1641 | |
| 10,319,291 B2* | 6/2019 | Ikeda | G09G 3/2092 | |
| 10,379,573 B2* | 8/2019 | Park | G06F 1/1677 | |
| 10,379,577 B2* | 8/2019 | Yeom | G06F 1/1662 | |
| 10,528,078 B2* | 1/2020 | Park | G06F 1/1616 | |
| 10,579,105 B2* | 3/2020 | Jones | H05K 1/028 | |
| 10,627,868 B2* | 4/2020 | Fujimoto | G09F 9/30 | |
| 10,671,115 B2* | 6/2020 | Park | G06F 1/1677 | |
| 2010/0201604 A1* | 8/2010 | Kee | G06F 1/1641 | 345/1.3 |
| 2015/0227224 A1* | 8/2015 | Park | G06F 3/0487 | 345/173 |
| 2017/0170417 A1* | 6/2017 | Myung | H01L 51/0097 | |
| 2017/0229100 A1* | 8/2017 | Chun | G06F 1/1647 | |
| 2019/0324639 A1* | 10/2019 | Gao | G06F 1/1615 | |
| 2019/0339738 A1* | 11/2019 | Hou | H04M 1/0268 | |
| 2020/0050318 A1* | 2/2020 | Ure | G06F 1/1632 | |
| 2020/0064885 A1* | 2/2020 | Park | G06F 3/0488 | |
| 2020/0064886 A1* | 2/2020 | Cho | G06F 1/1616 | |
| 2020/0098291 A1* | 3/2020 | Wu | H01L 29/78603 | |
| 2020/0150726 A1* | 5/2020 | Jones | G06F 1/1616 | |
| 2020/0205073 A1* | 6/2020 | Akkarakaran | H04W 24/08 | |
| 2020/0212325 A1* | 7/2020 | Seo | G06F 1/1616 | |
| 2020/0234616 A1* | 7/2020 | Ha | H01L 51/0097 | |
| 2020/0285275 A1* | 9/2020 | Park | G06F 1/1677 | |

FOREIGN PATENT DOCUMENTS

| | | |
|---|---|---|
| KR | 1020160027626 A | 3/2016 |
| KR | 1020160087972 A | 7/2016 |

* cited by examiner

10,909,889 B2

DISPLAY DEVICE

This application claims priority to Korean Patent Application No. 10-2019-0052892, filed on May 7, 2019, and all the benefits accruing therefrom under 35 U.S.C. § 119, the content of which in its entirety is herein incorporated by reference.

BACKGROUND

The disclosure relates to a display device, and more particularly, to a display device with improved reliability.

Display devices for displaying images may be included in electronic devices for providing images to users, such as smart phones, digital cameras, notebook computers, navigation systems, and smart televisions. Display devices may generate images and may provide the generated images to users through display screens.

Display devices having various shapes have been developed with the development of techniques. For example, foldable display devices capable of being curved, folded and/or rolled have been developed. The foldable display devices of which shapes can be variously changed may be easily portable and may improve convenience of users.

SUMMARY

The disclosure may provide a display device capable of reducing or mitigating the interference of folding portions of a display module.

In an embodiment of the invention, a display device includes a display module including a display panel including a front surface and a rear surface opposite to the front surface and a support member including a first surface facing the rear surface of the display panel and a second surface opposite to the first surface, and a guide unit disposed on the second surface of the support member. In such an embodiment, the display module includes a first folding portion foldable with a radius of curvature, a second folding portion spaced apart from the first folding portion and foldable with a radius of curvature which is equal to or greater than the radius of curvature of the first folding portion, a central portion disposed between the first and second folding portions, a first display portion spaced apart from the central portion with the first folding portion interposed therebetween, and a second display portion spaced apart from the central portion with the second folding portion interposed therebetween. The guide unit includes a rotation part overlapping the central portion, a first connection part connected to the rotation part, a second connection part spaced apart from the first connection part and connected to the rotation part, a wire part including a first end fixed to the first display portion and a second end fixed to the second connection part, and an elastic part including a first end fixed to the second surface of the support member and a second end fixed to at least one part selected from the rotation part, the first connection part and the second connection part.

In an embodiment, the first folding portion may be foldable about a first imaginary folding axis extending in a predetermined direction. In such an embodiment, the first connection part may overlap the second folding portion in a first state in which the first folding portion is unfolded, and the first connection part may be spaced apart from the second folding portion in a second state in which the first folding portion is folded about the first imaginary folding axis.

In an embodiment, the second folding portion may be foldable about a second imaginary folding axis extending in the predetermined direction. In the second state, the display module may be in-folded in a way such that the second surface of the support member overlapping the first display portion overlaps the front surface of the display panel overlapping the second display portion.

In an embodiment, the second folding portion may be foldable about a second imaginary folding axis extending in the predetermined direction. In such an embodiment, in the second state, the display module may be out-folded in a way such that the second surface of the support member overlapping the central portion overlaps the second surface of the support member overlapping the second display portion.

In an embodiment, the first end of the elastic part may be fixed to the second surface of the support member overlapping the second display portion, and the second end of the elastic part may be fixed to the first connection part.

In an embodiment, the first end of the elastic part may be fixed to the second surface of the support member overlapping the central portion, and the second end of the elastic part may be fixed to the rotation part.

In an embodiment, the first end of the elastic part may be fixed to the second surface of the support member overlapping the first display portion, and the second end of the elastic part may be fixed to the second connection part.

In an embodiment, the display device may further include a first sub-connection part connecting the first connection part and the rotation part, and a second sub-connection part connecting the second connection part and the rotation part.

In an embodiment, the display device may further include wall parts which guide movement directions of the first and second connection parts.

In an embodiment, the elastic part may include a compression spring or a tension spring.

In an embodiment, the elastic part may be disposed between the rotation part and the second surface of the support member overlapping the central portion, and the elastic part may include a torsion spring having a constant torque.

In an embodiment, each of the first and second folding portions may include a hinge.

In an embodiment of the invention, a display device includes a display module including a first folding portion foldable with a radius of curvature about a first imaginary folding axis extending in a predetermined direction, a second folding portion foldable with a radius of curvature, which is equal to or greater than the radius of curvature of the first folding portion, about a second imaginary folding axis extending in the predetermined direction, a central portion disposed between the first and second folding portions, a first display portion spaced apart from the central portion with the first folding portion interposed therebetween, and a second display portion spaced apart from the central portion with the second folding portion interposed therebetween; and a guide unit disposed under the display module, where the guide unit includes a rotation part overlapping the central portion, a first connection part connected to the rotation part, and a second connection part spaced apart from the first connection part and connected to the rotation part. In such an embodiment, the first connection part overlaps the second folding portion in a first state in which the first folding portion is unfolded, and the first connection part is spaced apart from the second folding portion in a second state in which the first folding portion is folded about the first imaginary folding axis.

In an embodiment, the display module may include a display panel including a front surface and a rear surface opposite to the front surface, and a support member including a first surface facing the rear surface of the display panel and a second surface opposite to the first surface.

In an embodiment, the second folding portion may be folded about the second imaginary folding axis extending in the predetermined direction. In the second state, the display module may be in-folded in such a way that the second surface of the support member overlapping the first display portion overlaps the front surface of the display panel overlapping the second display portion.

In an embodiment, the second folding portion may be folded about the second imaginary folding axis extending in the predetermined direction. In the second state, the display module may be out-folded in such a way that the second surface of the support member overlapping the central portion overlaps the second surface of the support member overlapping the second display portion.

In an embodiment, the guide unit may further include a wire part including a first end fixed to the first display portion and a second end fixed to the second connection part, and an elastic part including a first end fixed to the second surface of the support member and a second end fixed to at least one of the rotation part, the first connection part, or the second connection part.

In an embodiment, the first end of the elastic part may be fixed to the second surface of the support member overlapping the second display portion, and the second end of the elastic part may be fixed to the first connection part.

In an embodiment, the first end of the elastic part may be fixed to the second surface of the support member overlapping the central portion, and the second end of the elastic part may be fixed to the rotation part.

In an embodiment, the first end of the elastic part may be fixed to the second surface of the support member overlapping the first display portion, and the second end of the elastic part may be fixed to the second connection part.

In an embodiment, the display device may further include a first sub-connection part connected to the first connection part and the rotation part, and a second sub-connection part connected to the second connection part and the rotation part.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
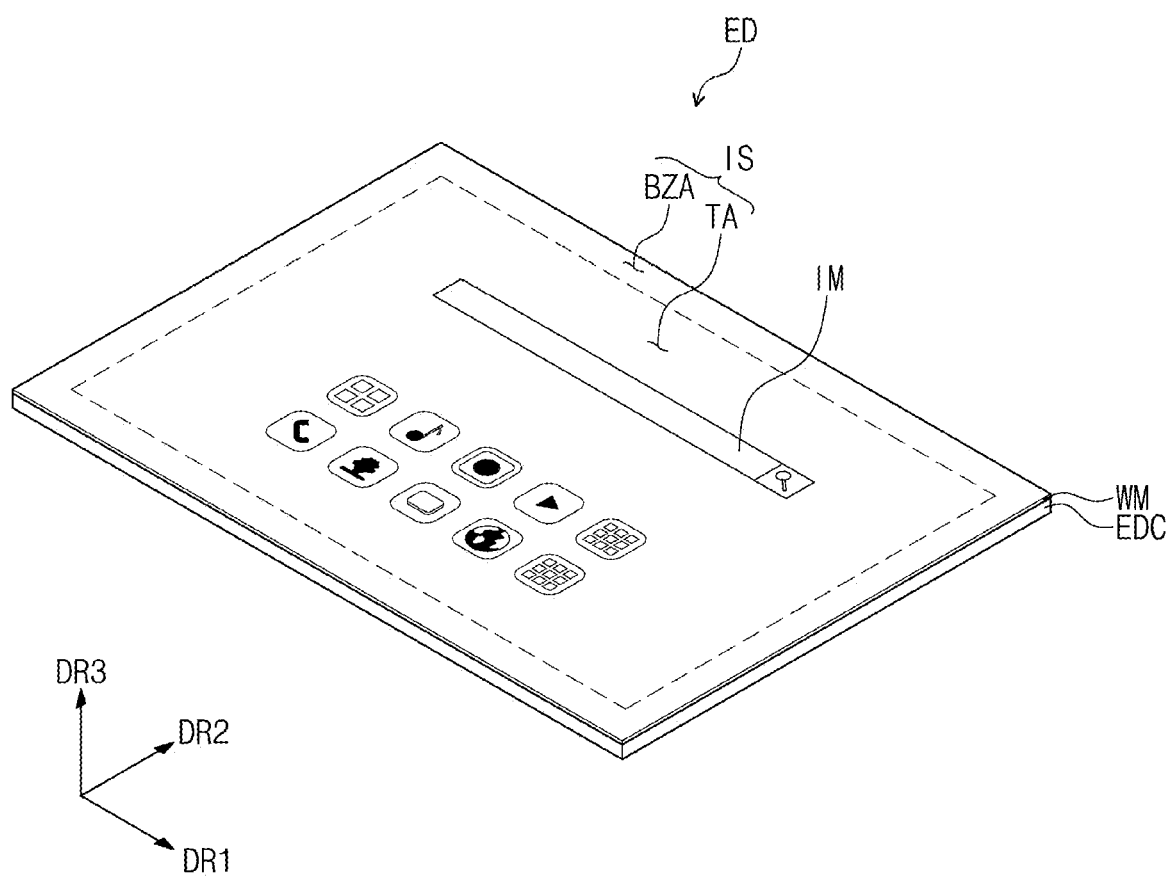
FIG. 1 is a perspective view illustrating a display device according to an embodiment of the invention.

The invention now will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scopes of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

Figure 2:
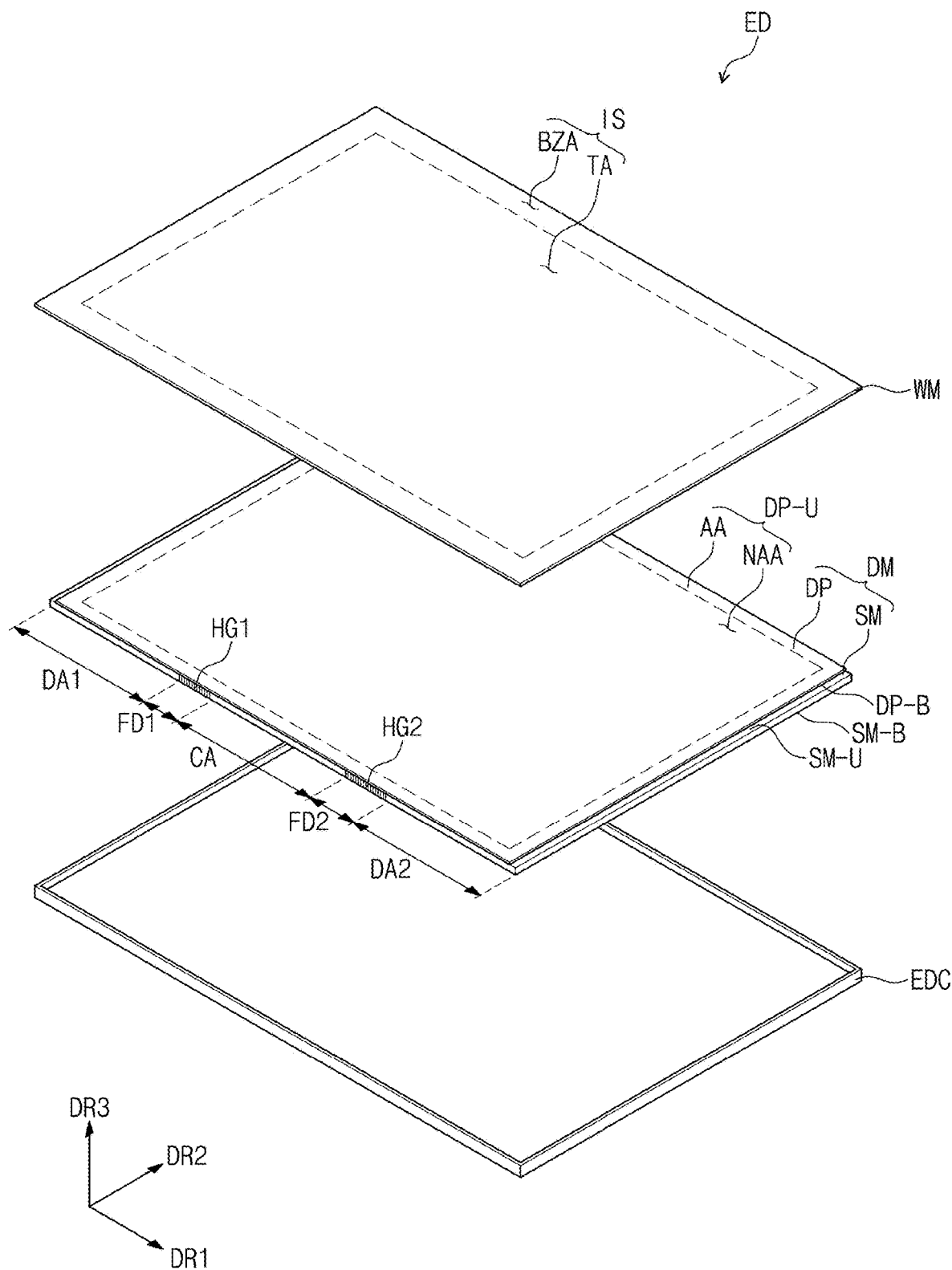
FIG. 2 is an exploded perspective view illustrating the display device of FIG. 1.
Figure 3A:
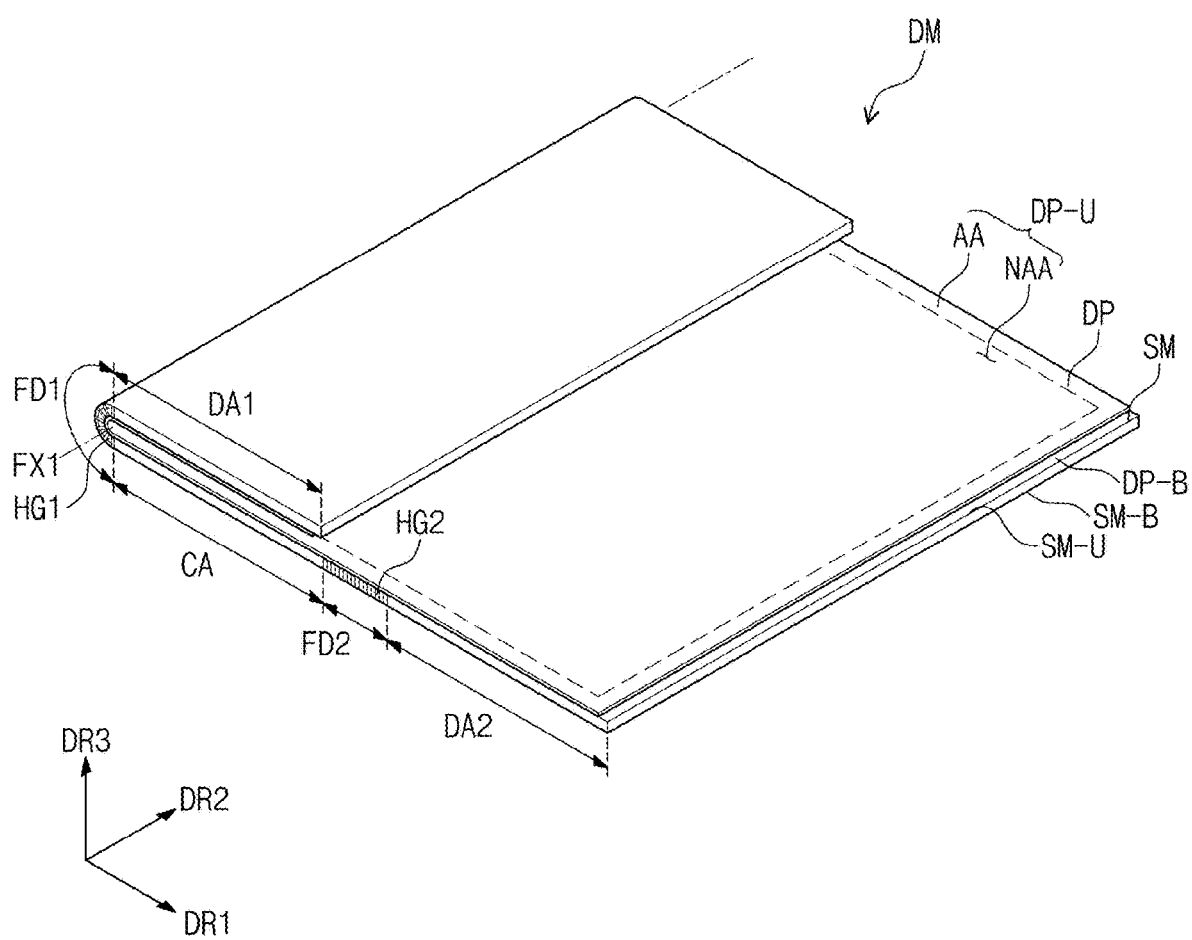
FIG. 3A is a perspective view illustrating a display module of which an area is folded, according to an embodiment of the invention.
Figure 3B:
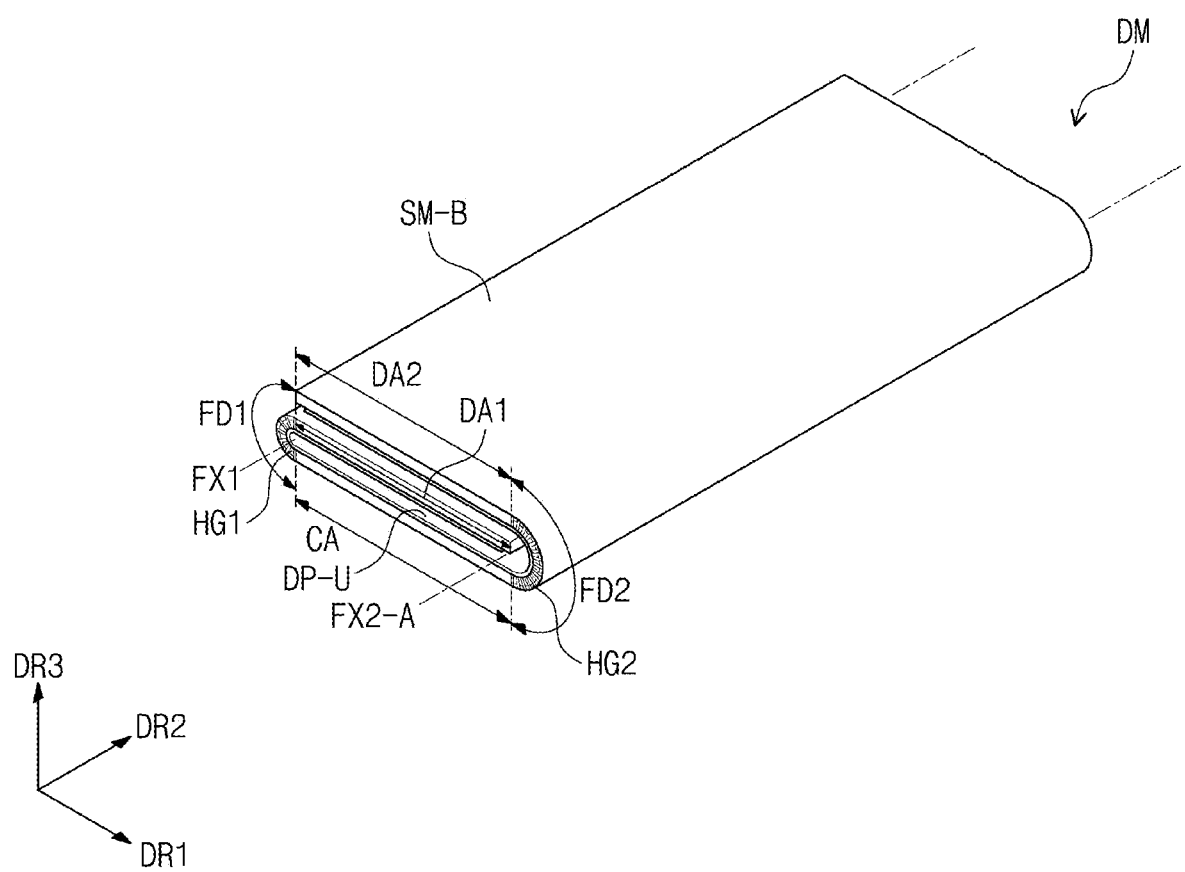
FIG. 3B is a perspective view illustrating a display module of which areas are folded, according to an embodiment of the invention.
Figure 3C:
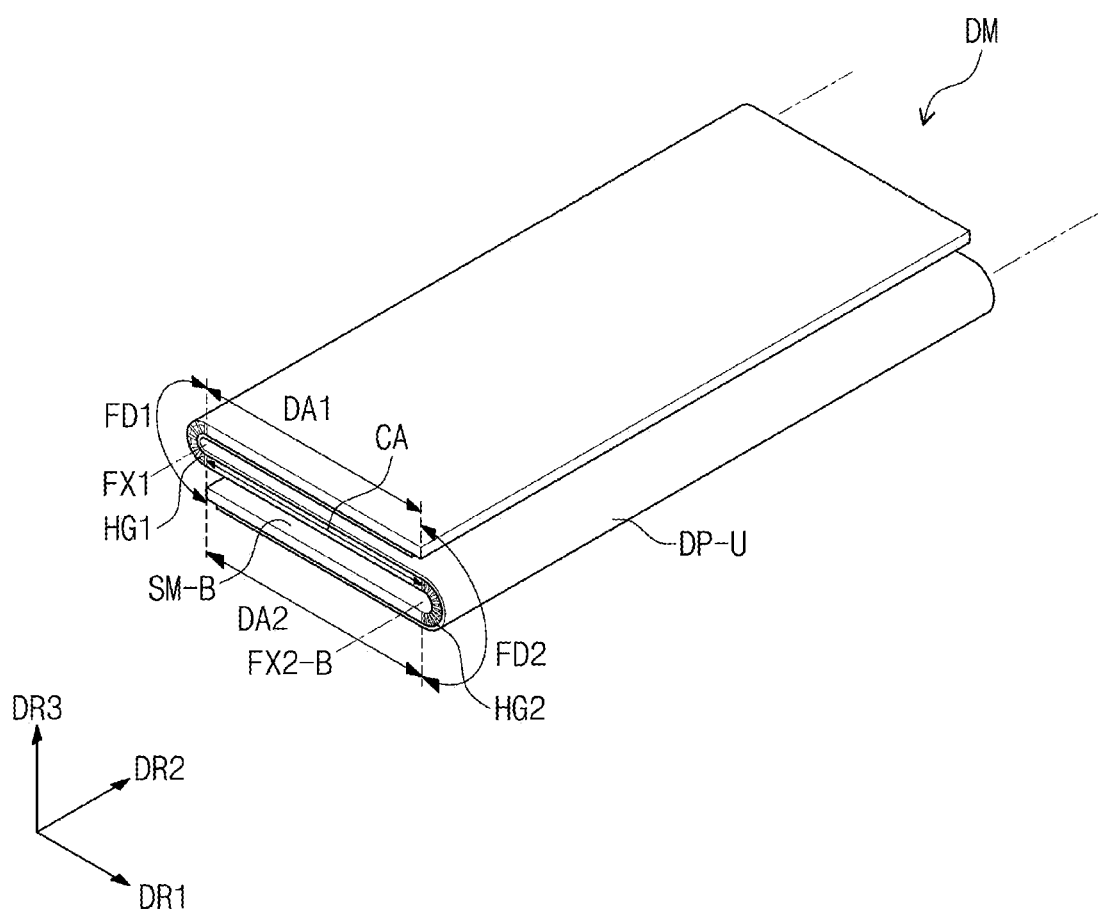
FIG. 3C is a perspective view illustrating a display module of which areas are folded, according to an embodiment of the invention.
Figure 4A:
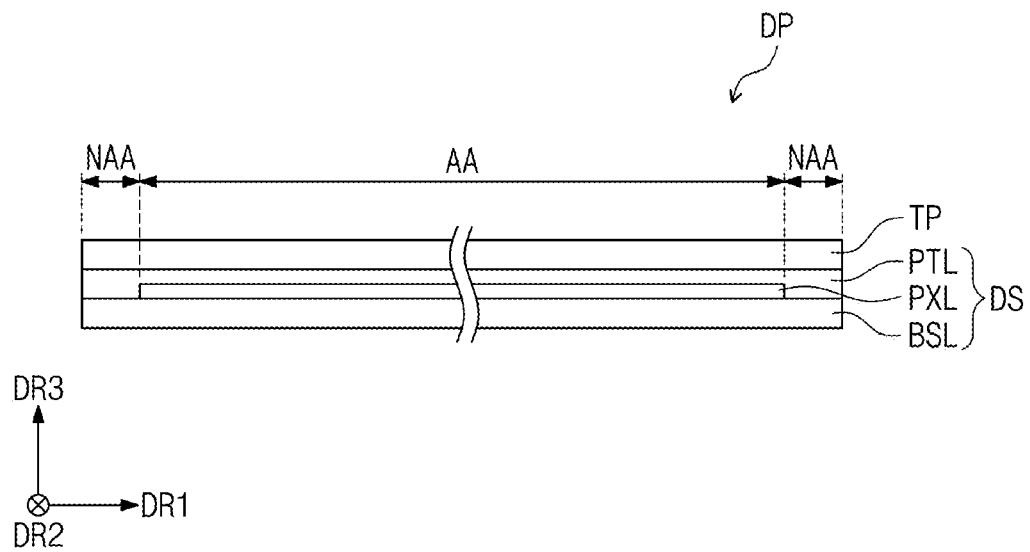
FIG. 4A is a cross-sectional view illustrating a display panel according to an embodiment of the invention.
Figure 4B:
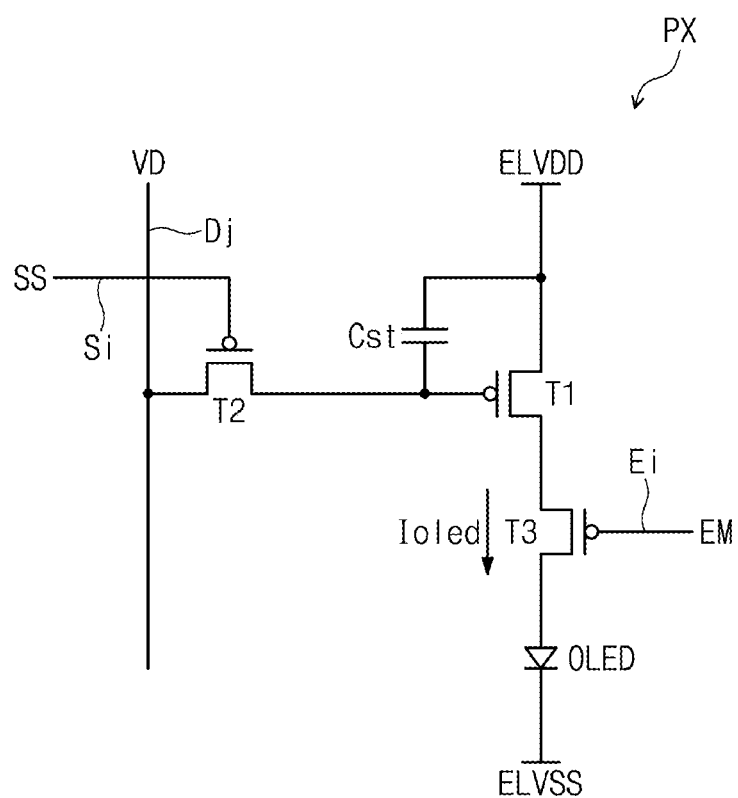
FIG. 4B is an equivalent circuit diagram of a pixel according to an embodiment of the invention.

FIG. 1 is a perspective view illustrating a display device according to an embodiment of the invention. FIG. 2 is an exploded perspective view illustrating the display device of FIG. 1. FIG. 3A is a perspective view illustrating a display module of which an area is folded, according to an embodiment of the invention. FIG. 3B is a perspective view illustrating a display module of which areas are folded, according to an embodiment of the invention. FIG. 3C is a perspective view illustrating a display module of which areas are folded, according to an embodiment of the invention. FIG. 4A is a cross-sectional view illustrating a display panel according to an embodiment of the invention. FIG. 4B is an equivalent circuit diagram of a pixel according to an embodiment of the invention. Hereinafter, a display device according to an embodiment of the invention will be described with reference to FIGS. 1 to 4B.

Referring to FIGS. 1 to 3C, an embodiment of a display device ED according to the invention may display an image IM through a display surface IS defined thereon. The display surface IS may be parallel to a plane defined by a first direction DR1 and a second direction DR2. A normal direction of the display surface IS (e.g., a thickness direction of the display device ED) may be indicated by a third direction DR3. FIG. 1 illustrates the display device ED in a first state in which the display device ED (e.g., a foldable display device) is unfolded.

An embodiment of the foldable display device ED applied to a mobile phone is illustrated in FIG. 1. Even though not shown in the drawings, electronic modules, a camera module and a power module, which are mounted on a main board, may be disposed together with the foldable display device ED in a bracket and/or a case to constitute the mobile phone. However, embodiments of the invention are not limited thereto. Alternatively, the foldable display device ED may also be applied to large-sized electronic devices (e.g., televisions and monitors) or small and middle-sized electronic devices (e.g., tablets, car navigation units, game consoles, and smart watches). As described above, the foldable display device is illustrated as an embodiment of the display device ED in FIGS. 1 and 2.

The display device ED may display the image IM on the display surface IS parallel to the first and second directions DR1 and DR2 in the third direction DR3. The display surface IS, on which the image IM is displayed, may correspond to a front surface of the display device ED. The image IM may include a dynamic image and a static image. In FIG. 1, an internet search box is illustrated as an example of the image IM.

The display device ED may include a window member WM, a display module DM, and an outer case EDC. The components of the display device ED are schematically illustrated in FIG. 2.

The window member WM may be disposed on the display module DM. The window member WM may be coupled to the outer case EDC such that the window member WM and the outer case EDC collectively define the exterior of the display device ED. The window member WM may be coupled to the outer case EDC to enclose the display module DM not to be exposed to an outside, thereby effectively protecting the display module DM.

The window member WM may include a transmission area TA and a bezel area BZA. The display surface IS of the display device ED may be substantially defined by the transmission area TA and the bezel area BZA of the window member WM.

The transmission area TA may be an area in which the image IM is displayed. A user may view the image IM through the transmission area TA. A shape of the transmission area TA may be variously modified.

The bezel area BZA may be adjacent to the transmission area TA. The bezel area BZA may have a predetermined color. The bezel area BZA may surround the transmission area TA when viewed in a plan view. Thus, the shape of the transmission area TA may be substantially defined by the bezel area BZA. However, embodiments of the invention are not limited thereto. In an alternative embodiment, the bezel area BZA may be adjacent to only a single side of the transmission area TA or may be omitted, for example. In embodiments of the invention, the display device ED may be variously embodied and is not limited to a specific embodiment.

The display module DM may include a display panel DP and a support member SM. The display panel DP may include a front surface DP-U and a rear surface DP-B opposite to the front surface DP-U. An active area AA and a peripheral area NAA may be defined in the front surface DP-U. The display panel DP may activate the active area AA by an electrical signal. The display panel DP may display the image IM in the activated active area AA. The transmission area TA may overlap at least an entire portion of the active area AA. The rear surface DP-B may be defined as a surface that is in contact with the support member SM.

The peripheral area NAA may be adjacent to the active area AA. The peripheral area NAA may surround an edge of the active area AA when viewed in a plan view. In an embodiment, the peripheral area NAA may surround all of edges of the active area AA. However, embodiments of the invention are not limited thereto. In an alternative embodiment, the peripheral area NAA may be adjacent to only a single edge of the active area AA.

Various kinds of signal lines and/or electronic elements for providing electrical signals to the active area AA may be disposed in the peripheral area NAA. The peripheral area NAA may be covered by the bezel area BZA and thus may not be visible from an outside.

Referring to FIG. 4A, an embodiment of the display panel DP may include a display unit DS and an input sensing layer TP. The input sensing layer TP may be disposed on the display unit DS.

The display unit DS may include a base layer BSL, a pixel layer PXL disposed on the base layer BSL, and a protective layer PTL covering the pixel layer PXL. The base layer BSL, the pixel layer PXL and the protective layer PTL may be sequentially stacked one on another in the third direction DR3. The base layer BSL may define the rear surface DP-B of the display panel DP and may have flexibility. The pixel layer PXL may include a plurality of pixels (not shown) and may be driven by applied electrical signals to generate the image IM. The protective layer PTL may protect the pixel layer PXL and may have a structure in which an organic layer and an inorganic layer are stacked, e.g., alternately and repeatedly stacked one on another. The input sensing layer TP may be disposed on the protective layer PTL.

FIG. 4B illustrates an equivalent circuit diagram of one pixel PX of the pixels included in the pixel layer PXL. An embodiment of the pixel PX may include an organic light emitting element used in an organic light emitting display panel.

The pixel PX may be connected to a scan line Si, a data line Dj, and an emission line Ei. Here, 'i' and 'j' are natural numbers. The pixel PX may include a light emitting element OLED, a driving transistor T1, a capacitive element Cst, a switching transistor T2, and an emission control transistor T3. The light emitting element OLED may be an organic light emitting element.

A source terminal of the driving transistor T1 may be provided with a first voltage ELVDD, and a drain terminal of the driving transistor T1 may be connected to a source terminal of the emission control transistor T3. A gate terminal of the driving transistor T1 may be connected to a drain terminal of the switching transistor T2.

A gate terminal of the switching transistor T2 may be connected to the scan line Si, and a source terminal of the switching transistor T2 may be connected to the data line Dj. A first electrode of the capacitive element Cst may be connected to the source terminal of the driving transistor T1, and a second electrode of the capacitive element Cst may be connected to the gate terminal of the driving transistor T1.

A gate terminal of the emission control transistor T3 may be connected to the emission line Ei, and a drain terminal of the emission control transistor T3 may be connected to an anode of the light emitting element OLED. A cathode of the light emitting element OLED may receive a second voltage ELVSS. A level of the second voltage ELVSS may be lower than a level of the first voltage ELVDD.

The switching transistor T2 may be turned on in response to a scan signal SS provided thereto through the scan line Si. The turned-on switching transistor T2 may provide a data voltage VD received through the data line Dj to the gate terminal of the driving transistor T1. The capacitive element Cst may store the data voltage VD applied to the gate terminal of the driving transistor T1 and may retain the stored data voltage VD after the switching transistor T2 is turned off.

The gate terminal of the emission control transistor T3 may receive an emission signal EM through the emission line Ei, and thus the emission control transistor T3 may be turned on. The turned-on emission control transistor T3 may provide a current bled flowing through the driving transistor T1 to the light emitting element OLED. The pixel PX may emit light while the emission signal EM is applied, and an intensity of the light emitted from the light emitting element OLED may be determined or changed based on the amount of the current bled provided to the light emitting element OLED.

In one embodiment, for example, the transistors T1 to T3 of the pixel PX may be P-type metal-oxide-semiconductor ("PMOS") transistors. However, embodiments of the invention are not limited thereto. In an alternative embodiment, the transistors T1 to T3 of the pixel PX may be N-type metal-oxide-semiconductor ("NMOS") transistors.

The input sensing layer TP may be a layer for sensing an external input. The input sensing layer TP may include an conductive layer and an insulating layer for insulating the conductive layer.

The external input may include at least one of various kinds of inputs provided from the outside of the display device ED. The external input may be provided in various forms. The external input may include an input (e.g., a hovering input) proximate to the display device ED by a predetermined distance as well as a touch of a part (e.g., a finger) of a user's body, for example. In addition, the external input may be provided in other various forms such as force, pressure, and/or light.

Referring back to FIGS. 1 and 2, the support member SM may include a first surface SM-U and a second surface SM-B. The first surface SM-U may be in contact with the rear surface DP-B of the display panel DP. The second surface SM-B may be opposite to the first surface SM-U. The second surface SM-B may be in contact with the outer case EDC. In an embodiment, as shown in FIGS. 3A to 3C, the support member SM may include hinge portions HG1 and HG2. An area in which a first hinge portion HG1 is disposed may be defined as a first folding portion FD1 of the display module DM. An area in which a second hinge portion HG2 is disposed may be defined as a second folding portion FD2 of the display module DM. In an embodiment, the hinge portions HG1 and HG2 may be hinges. In such an embodiment, the hinge may be foldable with a predetermined radius of curvature, but embodiments of the invention are not limited to a specific hinge.

Although not shown in the drawings, an embodiment of the support member SM may further include a functional layer for improving reliability of the display panel DP. The functional layer may be disposed under the display panel DP. The functional layer may include a plurality of layers. In one embodiment, for example, the functional layer may include a cushion layer having a foam shape and configured to absorb an impact of the display panel DP, a light blocking layer configured to block light provided from the display panel DP, and a heat dissipation layer configured to discharge heat generated from the display panel DP to the outside.

An embodiment of the display module DM may include a plurality of areas arranged in the first direction DR1. In one embodiment, for example, the display module DM may include (or be divided into) a central portion CA, a first display portion DA1, a second display portion DA2, the first folding portion FD1, and the second folding portion FD2.

The first folding portion FD1 may be defined as an area overlapping the first hinge portion HG1. Herein, the phrase "one element overlaps another element" may mean the one element overlaps the another element when viewed from a plan view in a thickness direction of the display device ED. The first folding portion FD1 may be foldable with a predetermined radius of curvature about a first folding axis FX1 extending in the second direction DR2.

Referring to FIG. 3A, when the first folding portion FD1 is folded about the first folding axis FX1, the display module DM may be in-folded in a way such that the front surface DP-U of the display panel DP overlapping the first display portion DA1 overlaps or faces the front surface DP-U of the display panel DP overlapping the central portion CA.

According to an embodiment of the invention, a state in which the first folding portion FD1 of the display module DM is unfolded may be defined as the first state, as illustrated in FIG. 2. A state in which the first folding portion FD1 is folded about the first folding axis FX1 may be defined as a second state, as illustrated in FIG. 3A.

The second folding portion FD2 may be defined as an area overlapping the second hinge portion HG2. The second folding portion FD2 may be foldable with a predetermined radius of curvature about a second folding axis FX2-A or FX2-B extending in the second direction DR2. The radius of curvature of the second folding portion FD2 when the second folding portion FD2 is folded about the second folding axis FX2-A or FX2-B may be equal to or greater than the radius of curvature of the first folding portion when the first folding portion FD1 is folded about the first folding axis FX1.

Referring to FIG. 3B, in the second state in which the first folding portion FD1 is folded about the first folding axis FX1 and the second folding portion FD2 is folded about the second folding axis FX2-A, the display module DM may be in-folded in a way such that the second surface SM-B of the support member SM overlapping the first display portion DA1 overlaps with or faces the front surface DP-U of the display panel DP overlapping the second display portion DA2. In such a state, the radius of curvature of the second folding portion FD2 may be greater than the radius of curvature of the first folding portion FD1.

Referring to FIG. 3C, in the second state in which the first folding portion FD1 is folded about the first folding axis FX1 and the second folding portion FD2 is folded about the second folding axis FX2-B, the display module DM may be out-folded in such a way that the second surface SM-B of the support member SM overlapping the central portion CA overlaps or faces the second surface SM-B of the support member SM overlapping the second display portion DA2. In such a state, the radius of curvature of the second folding portion FD2 may be equal to or greater than the radius of curvature of the first folding portion FD1.

In FIGS. 3A to 3C, the window member WM and the outer case EDC are omitted for the purpose of ease and convenience in description and illustration. However, the window member WM and the outer case EDC may be coupled to each other and may be folded in a substantially same shape as the display module DM illustrated in FIGS. 3A to 3C.

In an embodiment of the invention, the display device ED includes a plurality of the folding portions FD1 and FD2, such that the shape of the display device ED may be variously changed according to the intended use. Thus, convenience of use of the display device ED may be increased or improved.

Figure 5A:
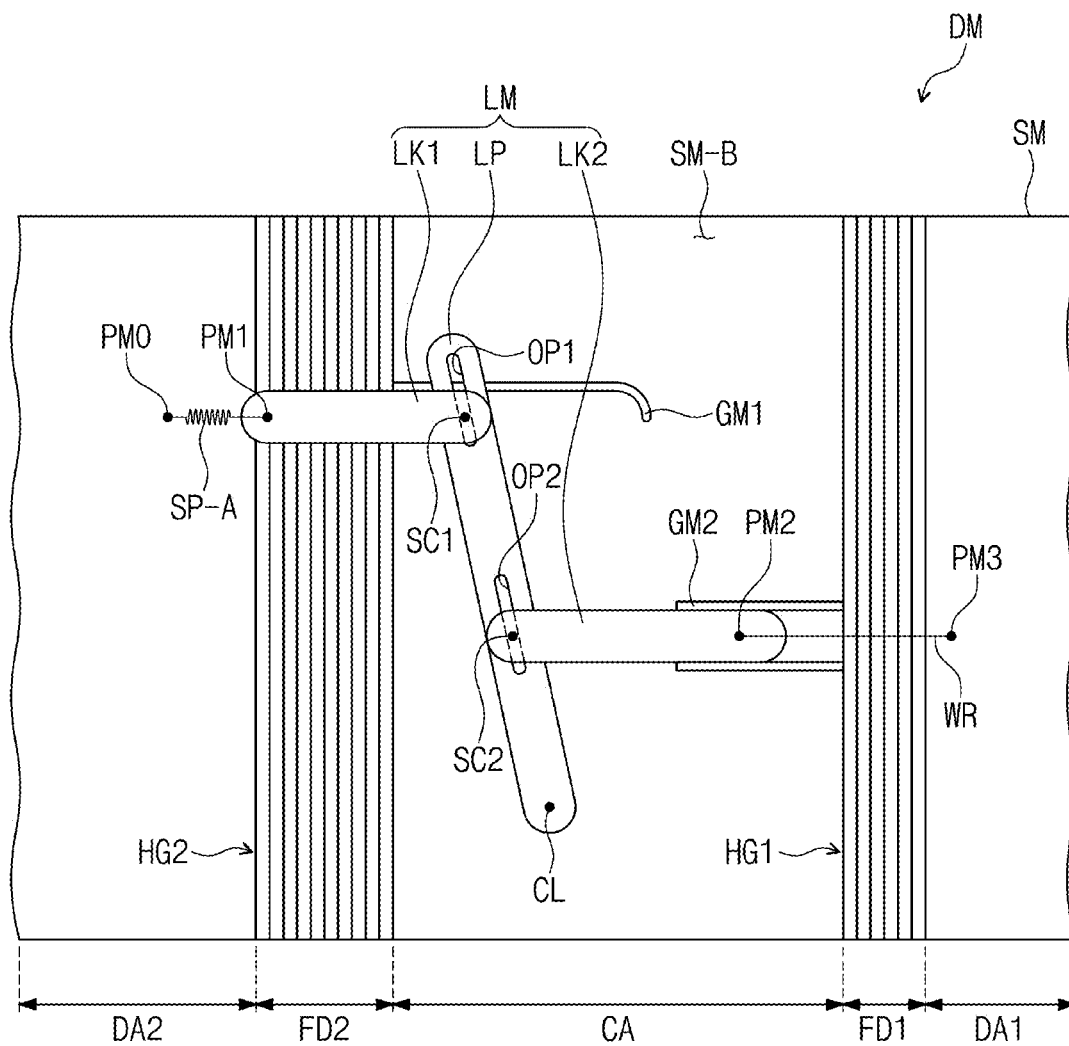
FIG. 5A is a plan view illustrating a display module according to an embodiment of the invention.
Figure 5A:
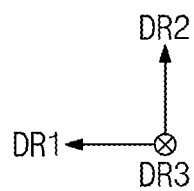
Figure 5B:
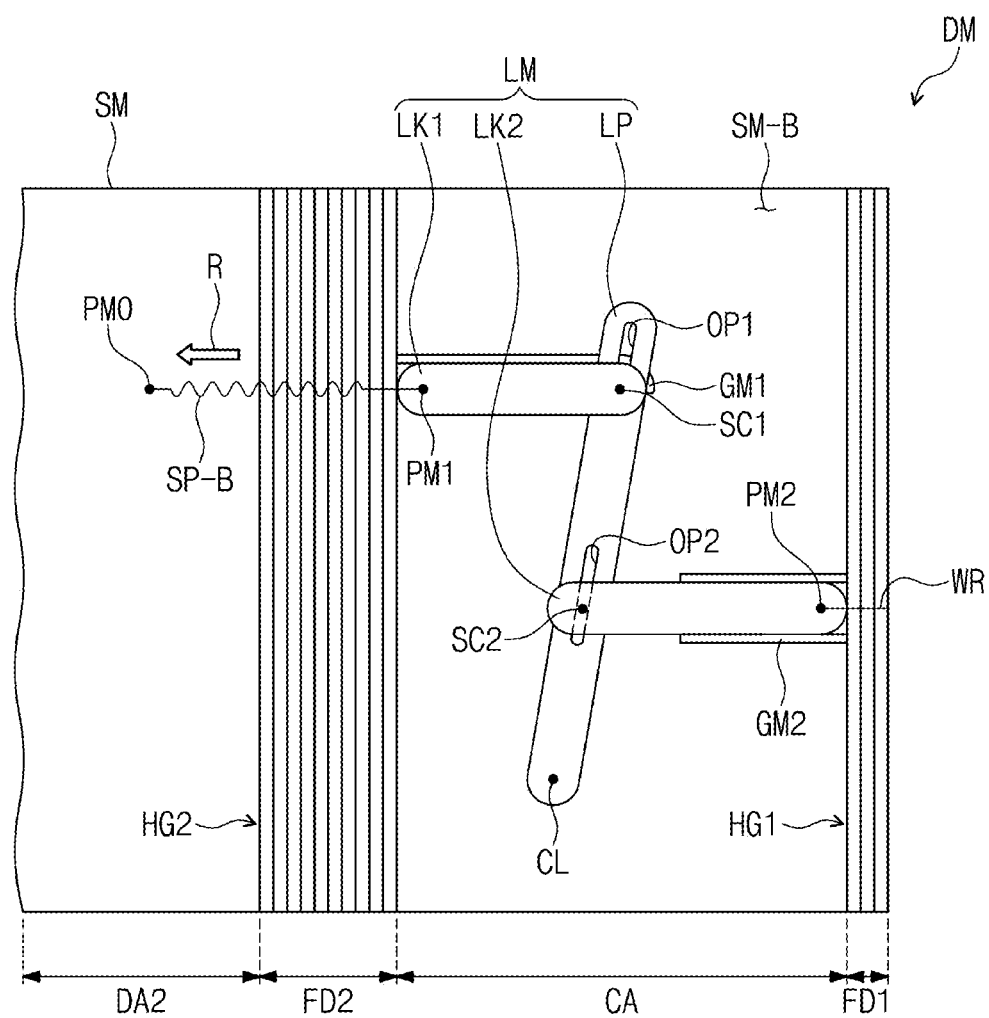
FIG. 5B is a plan view illustrating a state in which the display module of FIG. 5A is folded.

FIG. 5A is a plan view illustrating a display module according to an embodiment of the invention. FIG. 5B is a plan view illustrating a state in which the display module of FIG. 5A is folded. Hereinafter, the same or like components in FIGS. 5A and 5B as those described above with reference to FIGS. 1 to 4B will be indicated by the same reference characters, and any repetitive detailed description thereof will be omitted.

In an embodiment, the display device ED may include a guide unit LM. The guide unit LM may be disposed on the second surface SM-B of the support member SM. In such an embodiment, the guide unit may determine a folded order of the plurality of folding portions FD1 and FD2. Hereinafter, the guide unit LM will be described in detail.

In an embodiment, the guide unit LM may include a rotation part LP, a first connection part LK1, a second connection part LK2, a wire part WR, and an elastic part SP-A or SP-B.

FIG. 5A illustrates arrangement of the components included in the guide unit LM in the first state of the display module DM (i.e., the unfolded state of the display module DM, see FIG. 1 or 2).

In an embodiment, a first opening OP1 and a second opening OP2 are defined in the rotation part LP. The rotation part LP may be disposed on the second surface SM-B of the support member SM overlapping the central portion CA. The rotation part LP may be coupled to the second surface SM-B of the support member SM through a rotation shaft CL. The rotation part LP may be rotatable about the rotation shaft CL at a predetermined angle.

The first connection part LK1 may include a first protrusion SC1. The first connection part LK1 may extend in the first direction DR1. The first connection part LK1 may be connected to the rotation part LP. The first protrusion SC1 may be disposed in the first opening OP1 of the rotation part LP. An area of the first opening OP1 may be greater than an area of the first protrusion SC1. Thus, the first opening OP1 may have a space in which the first protrusion SC1 is movable.

The second connection part LK2 may include a second protrusion SC2. The second connection part LK2 may extend in the first direction DR1. The second connection part LK2 may be connected to the rotation part LP. The second protrusion SC2 may be disposed in the second opening OP2 of the rotation part LP. An area of the second opening OP2 may be greater than an area of the second protrusion SC2. Thus, the second opening OP2 may have a space in which the second protrusion SC2 is movable.

According to an embodiment of the invention, the first and second connection parts LK1 and LK2 may be connected to the rotation part LP, and the rotation part LP may be coupled to the second surface SM-B of the support member SM through the rotation shaft CL. Thus, when the rotation part LP moves about the rotation shaft CL, the first and second connection parts LK1 and LK2 may move together with the rotation shaft CL.

In an embodiment, the elastic part SP-A may be connected to the second surface SM-B of the support member SM and to the first connection part LK1, the rotation part LP or the second connection part LK2. In one embodiment, for example, one end (e.g., a first send) PM0 of the elastic part SP-A may be fixed to the second surface SM-B of the support member SM overlapping the second display portion DA2, and another end (e.g., a second end) PM1 of the elastic part SP-A may be connected to the first connection part LK1.

The elastic part SP-A or SP-B may be a member having restoring force. In one embodiment, for example, the elastic part SP-A or SP-B may include at least one of various members having elasticity, such as an elastic band and a spring. In an embodiment, where the elastic part SP-A or SP-B is a spring having elasticity, the elastic part SP-A or SP-B may be a coil spring, a plate spring, a hydraulic spring, a tension spring, or a torsion spring, for example.

In an embodiment, the elastic part SP-A or SP-B may be the tension spring. Thus, when the first connection part LK1 moves in a direction from the central portion CA toward the first folding portion FD1, the first connection part LK1 may be easily returned in a direction from the central portion CA toward the second folding portion FD2 by the restoring force of the elastic part SP-A provided as the tension spring.

The wire part WR may be connected to the second connection part LK2 and the second surface SM-B of the support member SM. In one embodiment, for example, one end (e.g., a first end) PM2 of the wire part WR may be connected to the second connection part LK2, and another end (e.g., a second end) PM3 of the wire part WR may be fixed to the second surface SM-B of the support member SM overlapping the first display portion DA1.

According to an embodiment of the invention, in the first state, the first connection part LK1 may overlap the second folding portion FD2. The first connection part LK1 may support the second hinge portion HG2 in the first state, and thus the second folding portion FD2 may not be folded before the first folding portion FD1 is folded.

FIG. 5B illustrates arrangement of the components included in the guide unit LM in the second state of the display module DM (i.e., the state in which the display module DM is folded about the first folding axis FX1; see FIG. 3A).

According to an embodiment of the invention, the wire part WR may be connected to the second connection part LK2 and the second surface SM-B of the support member SM overlapping the first display portion DA1. Thus, when the first folding portion FD1 is folded about the first folding axis FX1 (see FIG. 3A), the second connection part LK2 may move in the direction from the central portion CA toward the first folding portion FD1. In such an embodiment, the rotation part LP connected to the second connection part LK2 may be rotated about the rotation shaft CL, and the first connection part LK1 may be moved by the rotation of the rotation part LP.

According to an embodiment of the invention, in the second state (see FIG. 3A), the first connection part LK1 may be spaced apart from the second folding portion FD2. The first connection part LK1 may be spaced apart from the second hinge portion HG2 in the second state, and thus the second folding portion FD2 may be in-folded or out-folded as desired by a user.

When the first folding portion FD1 and the second folding portion FD2 are unfolded by a user, the first connection part LK1 may be easily returned to a position overlapping the second hinge portion HG2 by the restoring force R of the elastic part SP-B.

The elastic part SP-A of FIG. 5A and the elastic part SP-B of FIG. 5B are indicated by different reference characters for the purpose of showing different states of the display module DM. However, the elastic part SP-A of FIG. 5A and the elastic part SP-B of FIG. 5B correspond to a same component.

According to an embodiment of the invention, the second folding portion FD2 having the radius of curvature equal to or greater than that of the first folding portion FD1 may be folded after the second state in which the first folding portion FD1 having the relatively small radius of curvature is folded. Thus, since the folding order of the folding portions FD1 and FD2 is determined by the guide unit LM, interference between folded areas may be minimized. As a result, damage of the display device ED may be effectively prevented and reliability of the display device ED may be improved.

According to an embodiment, the guide unit LM may further include wall parts GM1 and GM2. The wall parts GM1 and GM2 may be disposed on the second surface SM-B of the support member SM. The wall parts GM1 and GM2 may guide movement directions of the first and second connection parts LK1 and LK2. Thus, even when the display device ED is repeated folded and unfolded by a user, the first and second connection parts LK1 and LK2 may be moved to the same positions by the wall parts GM1 and GM2.

Figure 6A:
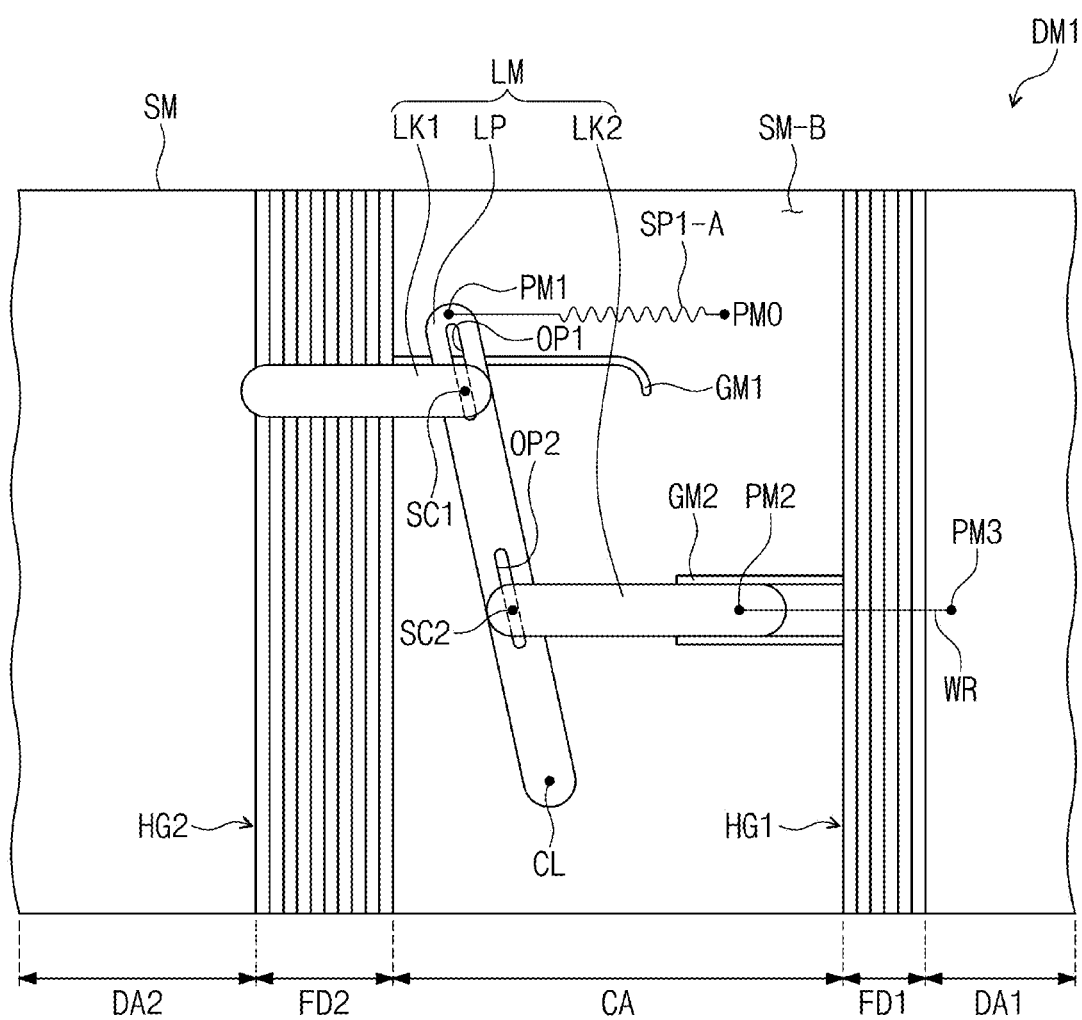
FIG. 6A is a plan view illustrating a display module according to an alternative embodiment of the invention.
Figure 6B:
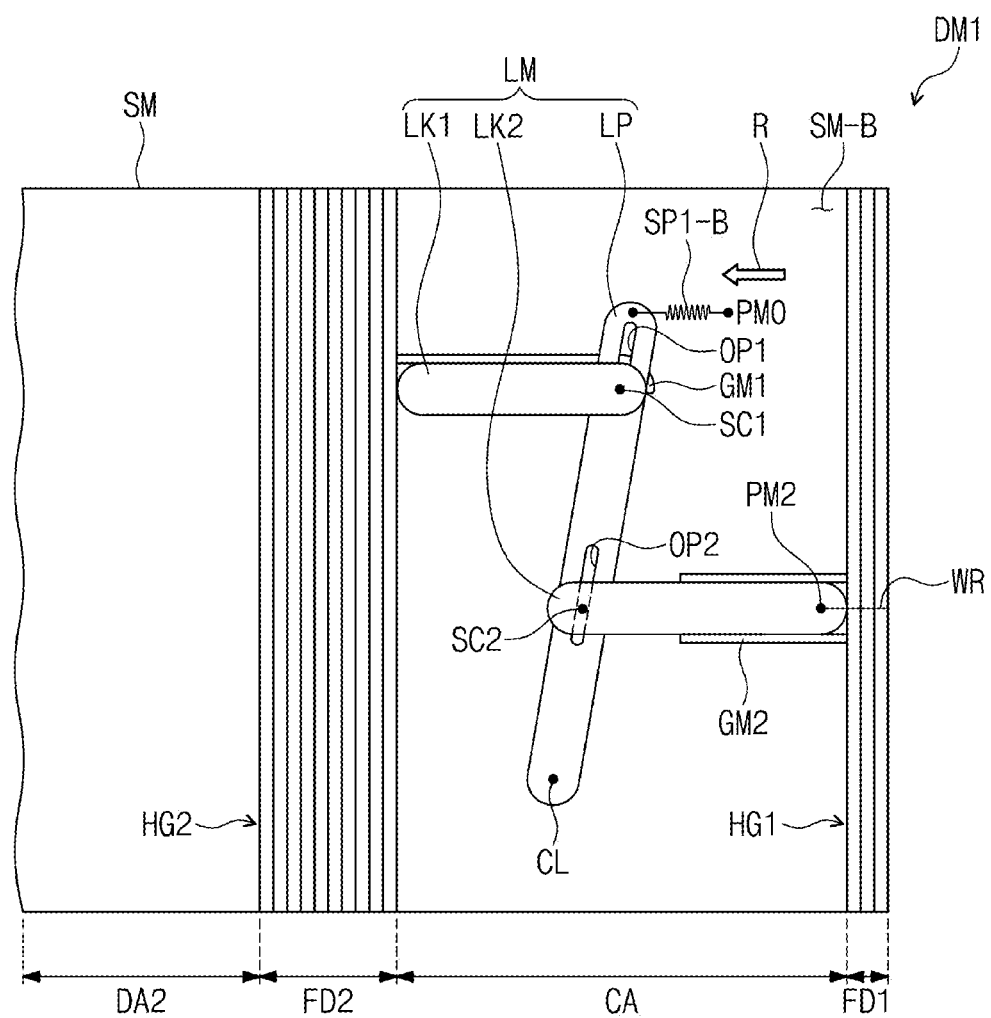
FIG. 6B is a plan view illustrating a state in which the display module of FIG. 6A is folded.
Figure 6B:
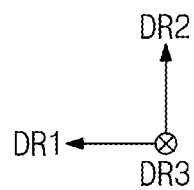
Figure 7A:
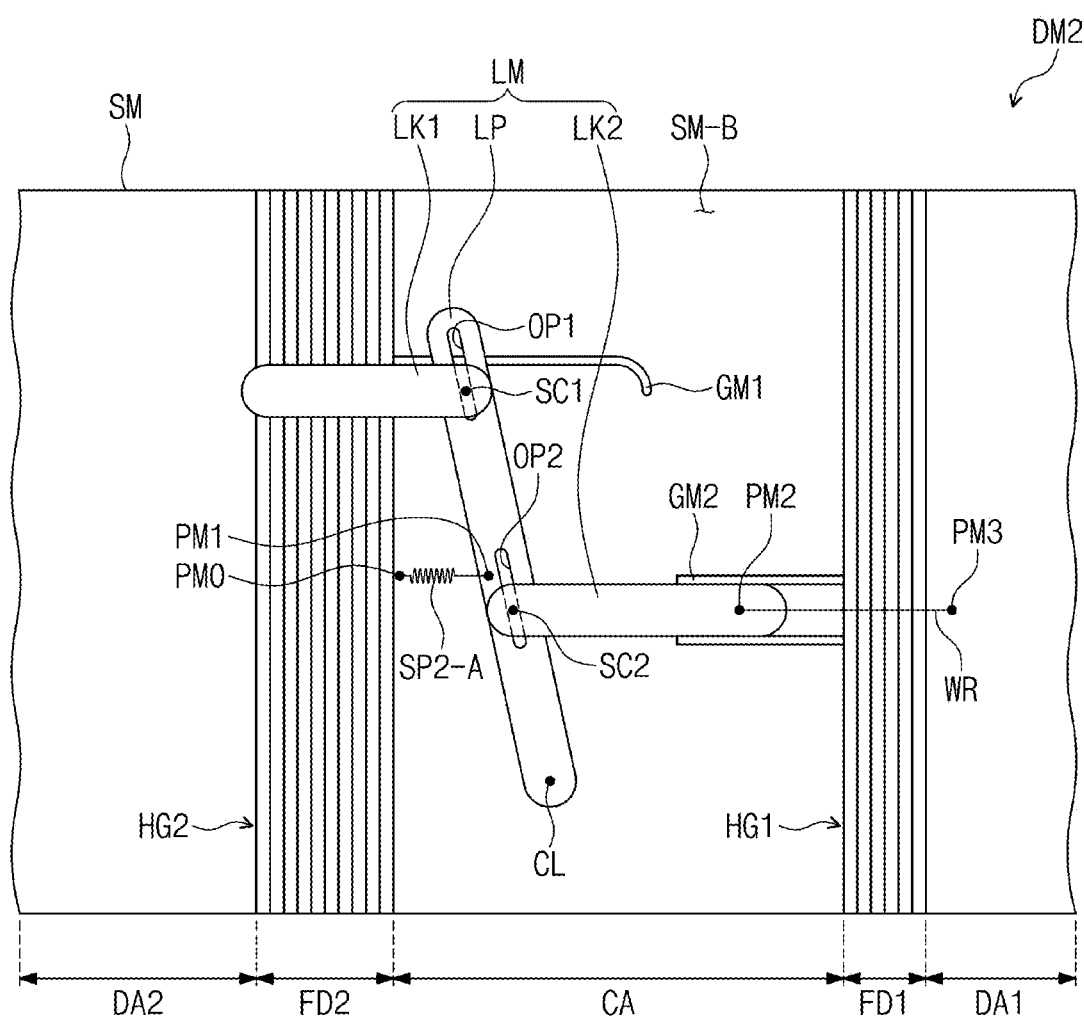
FIG. 7A is a plan view illustrating a display module according to another alternative embodiment of the invention.
Figure 7A:
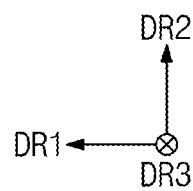
Figure 7B:
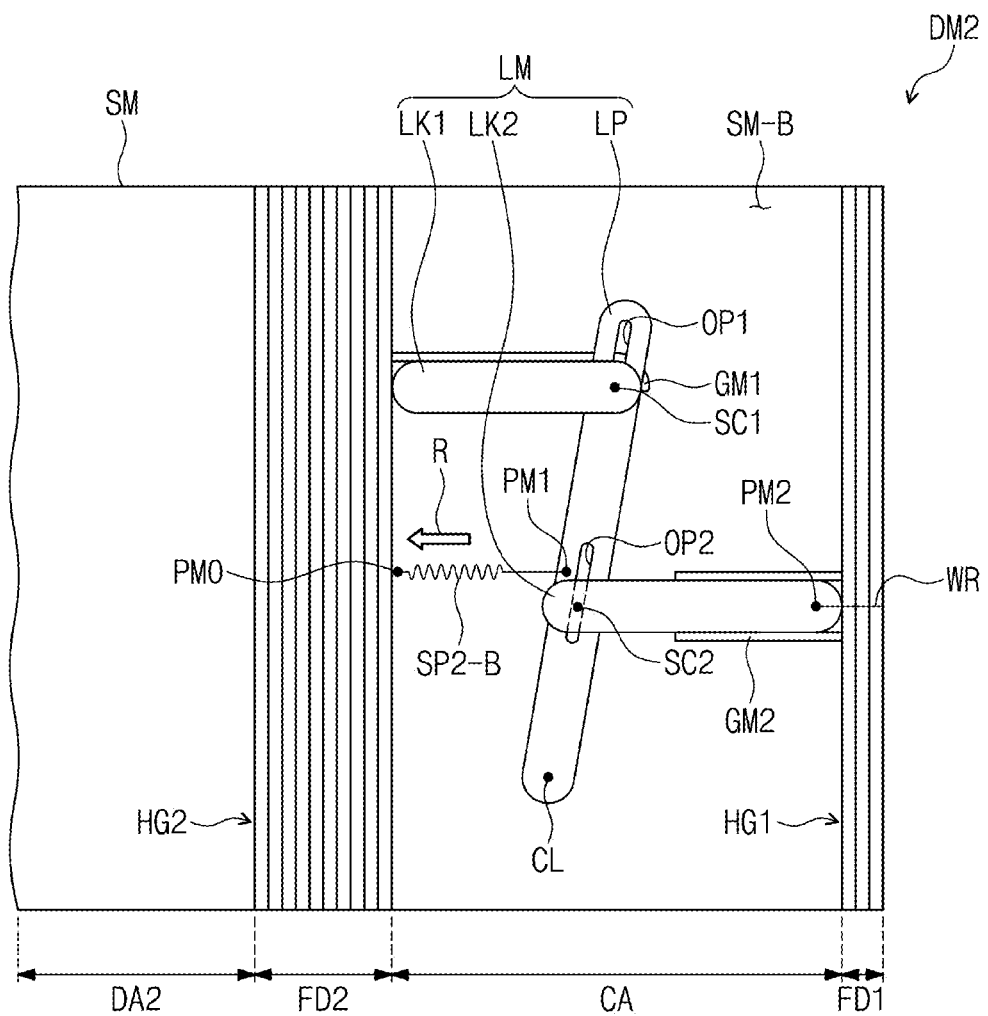
FIG. 7B is a plan view illustrating a state in which the display module of FIG. 7A is folded.
Figure 7B:
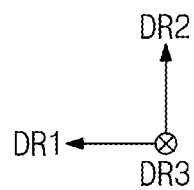
Figure 8A:
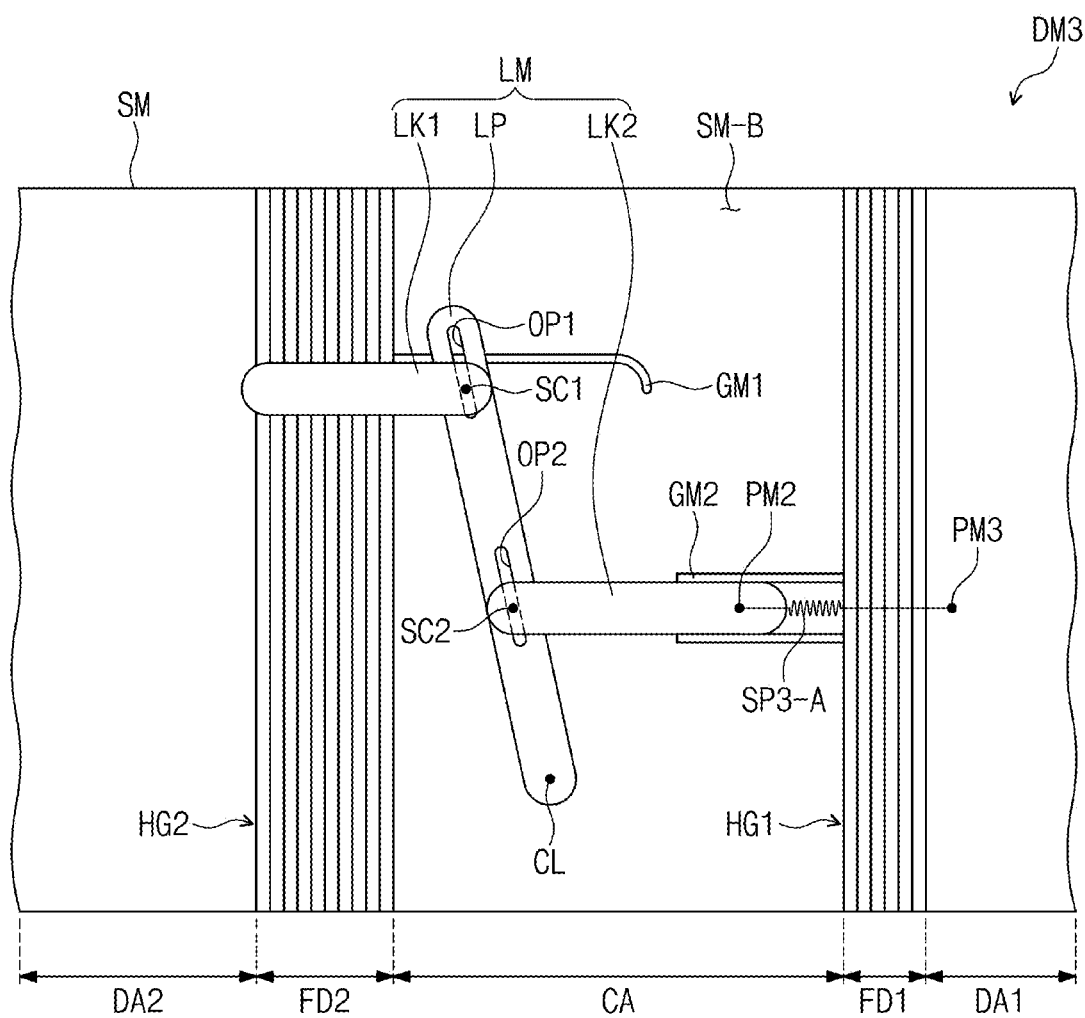
FIG. 8A is a plan view illustrating a display module according to another alternative embodiment of the invention.
Figure 8B:
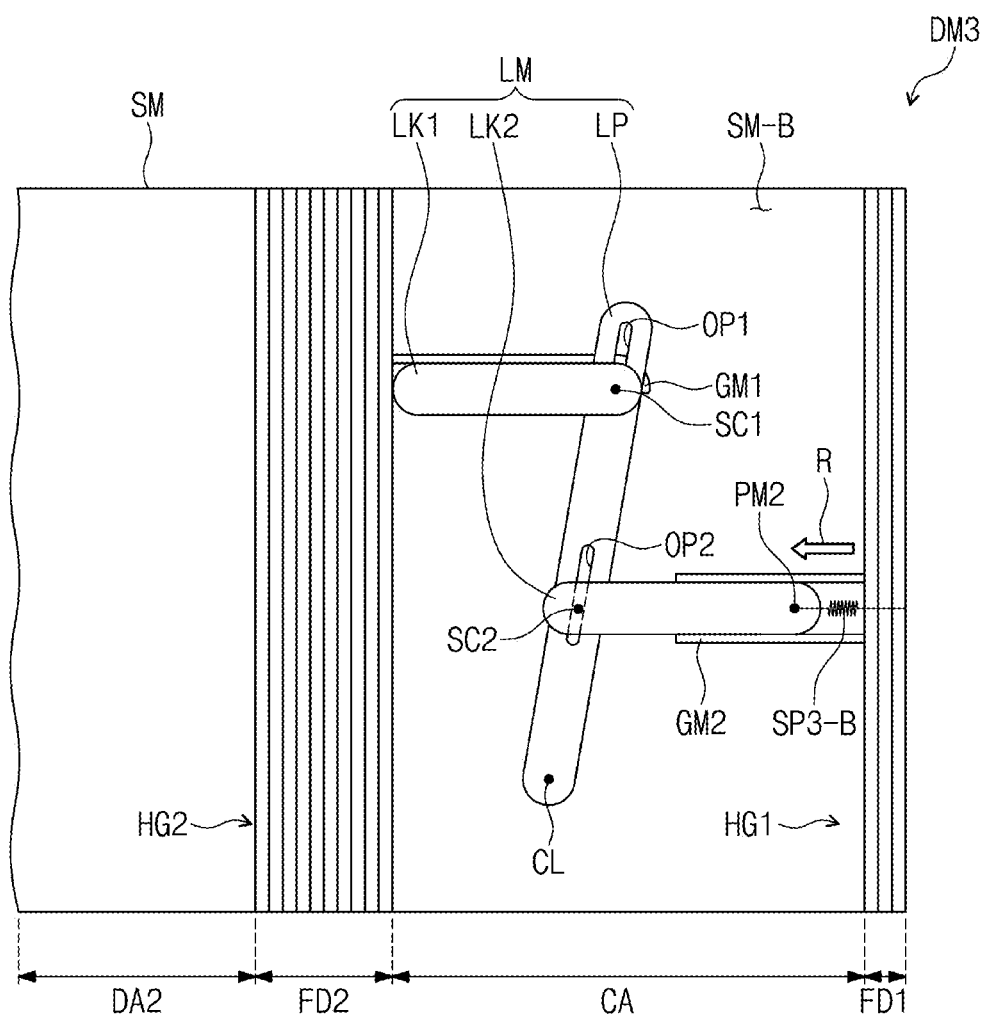
FIG. 8B is a plan view illustrating a state in which the display module of FIG. 8A is folded.
Figure 8B:
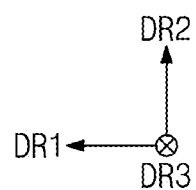

FIG. 6A is a plan view illustrating a display module according to an alternative embodiment of the invention. FIG. 6B is a plan view illustrating a state in which the display module of FIG. 6A is folded. FIG. 7A is a plan view illustrating a display module according to another alternative embodiment of the invention. FIG. 7B is a plan view illustrating a state in which the display module of FIG. 7A is folded. FIG. 8A is a plan view illustrating a display module according to another alternative embodiment of the invention. FIG. 8B is a plan view illustrating a state in which the display module of FIG. 8A is folded. Hereinafter, the same or like components in FIGS. 6A to 8B as those described above with reference to FIGS. 1 to 4B will be indicated by the same reference characters, and any repetitive detailed description thereof will be omitted.

Referring to FIGS. 6A and 6B, an embodiment of a display module DM1 may include an elastic part SP1-A or SP1-B disposed on the second surface SM-B of the support member SM overlapping the central portion CA. One end (e.g., a first end) PM0 of the elastic part SP1-A or SP1-B may be fixed to the second surface SM-B of the support member SM overlapping the central portion CA, and another end (e.g., a second end) PM1 of the elastic part SP1-A or SP1-B may be connected to the rotation part LP.

In such an embodiment, the elastic part SP1-A or SP1-B may be a compression spring. The elastic part SP1-A or SP1-B may have compressive stress in a process changed from the first state into the second state. In a process of unfolding the first folding portion FD 1 and the second folding portion FD2 by a user, the first connection part LK1 may be easily returned to a position overlapping the second hinge portion HG2 by the restoring force R of the elastic part SP1-A or SP1-B.

The elastic part SP1-A of FIG. 6A and the elastic part SP1-B of FIG. 6B are indicated by different reference characters for the purpose of showing different states of the display module DM1. However, the elastic part SP1-A of FIG. 6A and the elastic part SP1-B of FIG. 6B correspond to the same component.

Referring to FIGS. 7A and 7B, an alternative embodiment of a display module DM2 may include an elastic part SP2-A or SP2-B disposed on the second surface SM-B of the support member SM overlapping the central portion CA. One end (e.g., a first end) PM0 of the elastic part SP2-A or SP2-B may be fixed to the second surface SM-B of the support member SM overlapping the central portion CA, and another end (e.g., a second end) PM1 of the elastic part SP2-A or SP2-B may be connected to the rotation part LP.

In such an embodiment, the elastic part SP2-A or SP2-B may be a compression spring. The elastic part SP2-A or SP2-B may have compressive stress in a process changed from the first state into the second state. In a process of unfolding the first folding portion FD1 and the second folding portion FD2 by a user, the first connection part LK1 may be easily returned to a position overlapping the second hinge portion HG2 by the restoring force R of the elastic part SP2-A or SP2-B.

The elastic part SP2-A of FIG. 7A and the elastic part SP2-B of FIG. 7B are indicated by different reference characters for the purpose of showing different states of the display module DM2. However, the elastic part SP2-A of FIG. 7A and the elastic part SP2-B of FIG. 7B correspond to the same component.

Referring to FIGS. 8A and 8B, another alternative embodiment of a display module DM3 may include an elastic part SP3-A or SP3-B disposed on the second surface SM-B of the support member SM overlapping the central portion CA. One end (e.g., a first end) PM2 of the elastic part SP3-A or SP3-B may be connected to the second connection part LK2, and another end (e.g., a second end) PM3 of the elastic part SP3-A or SP3-B may be fixed to the second surface SM-B of the support member SM overlapping the first display portion DA1.

In such an embodiment, the elastic part SP3-A or SP3-B may be a tension spring. The elastic part SP3-A or SP3-B may have tensile stress in a process changed from the first state into the second state. In a process of unfolding the first folding portion FD1 and the second folding portion FD2 by a user, the first connection part LK1 may be easily returned to a position overlapping the second hinge portion HG2 by the restoring force R of the elastic part SP3-A or SP3-B.

In such an embodiment, since the one end PM2 of the elastic part SP3-A or SP3-B is connected to the second connection part LK2 and the other end PM3 of the elastic part SP3-A or SP3-B is fixed to the second surface SM-B of the support member SM overlapping the first display portion DA1, the wire part WR may be omitted.

The elastic part SP3-A of FIG. 8A and the elastic part SP3-B of FIG. 8B are indicated by different reference characters for the purpose of showing different states of the display module DM3. However, the elastic part SP3-A of FIG. 8A and the elastic part SP3-B of FIG. 8B correspond to substantially same component.

Figure 9A:
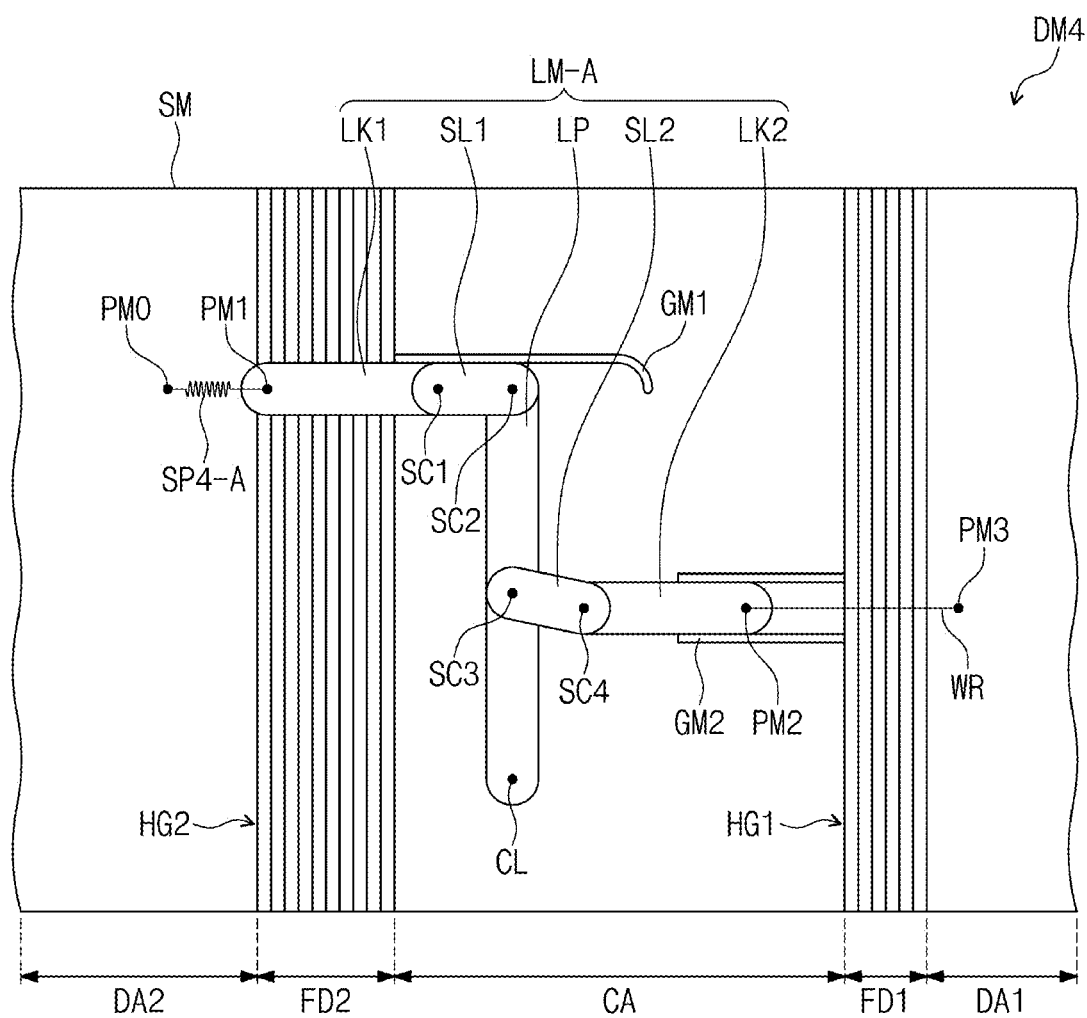
FIG. 9A is a plan view illustrating a display module according to another alternative embodiment of the invention.
Figure 9A:
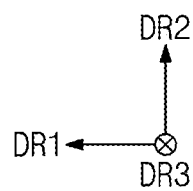
Figure 9B:
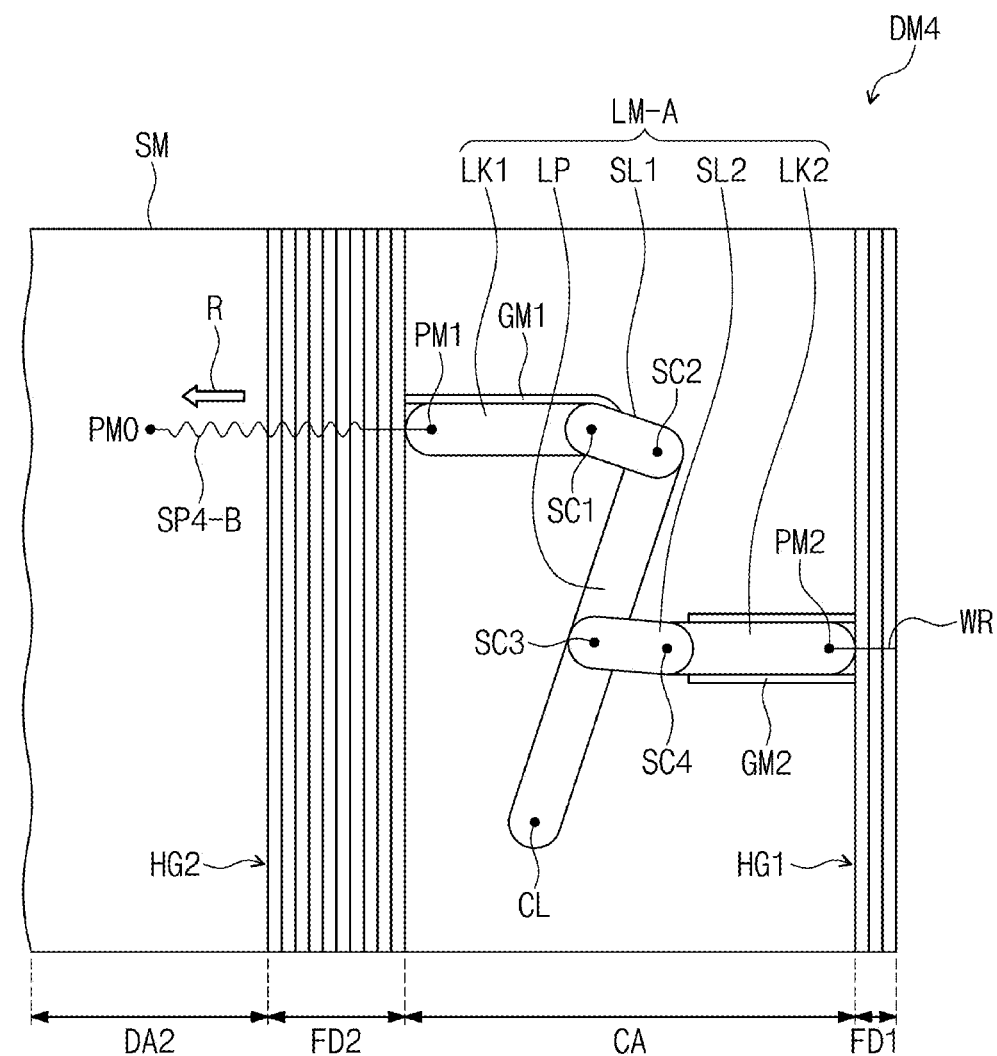
FIG. 9B is a plan view illustrating a state in which the display module of FIG. 9A is folded.
Figure 9B:
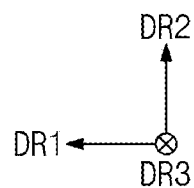

FIG. 9A is a plan view illustrating a display module according to another alternative embodiment of the invention. FIG. 9B is a plan view illustrating a state in which the display module of FIG. 9A is folded. Hereinafter, the same components in FIGS. 9A and 9B as those described above with reference to FIGS. 1 to 4B will be indicated by the same reference characters, and any repetitive detailed description thereof will be omitted.

Referring to FIGS. 9A and 9B, in an alternative embodiment, a guide unit LM-A of a display module DM4 may include a rotation part LP, a first connection part LK1, a second connection part LK2, a wire part WR, an elastic part SP4-A or SP4-B, a first sub-connection part SL1, and a second sub-connection part SL2.

The first sub-connection part SL1 may connect the first connection part LK1 and the rotation part LP. The first connection part LK1 and the rotation part LP may be connected to one end (e.g., a first end) SC1 and another end (e.g., a second end) SC2 of the first sub-connection part SL1, respectively.

The second sub-connection part SL2 may connect the second connection part LK2 and the rotation part LP. The rotation part LP and the second connection part LK2 may be connected to one end (e.g., a first end) SC3 and another end (e.g., a second end) SC4 of the second sub-connection part SL2, respectively. The sub-connection parts SL1 and SL2 may move fluidly in a change process between the first state and the second state.

The elastic part SP4-A of FIG. 9A and the elastic part SP4-B of FIG. 9B are indicated by different reference characters for the purpose of showing different states of the display module DM4. However, the elastic part SP4-A of FIG. 9A and the elastic part SP4-B of FIG. 9B correspond to the same component.

Figure 10:
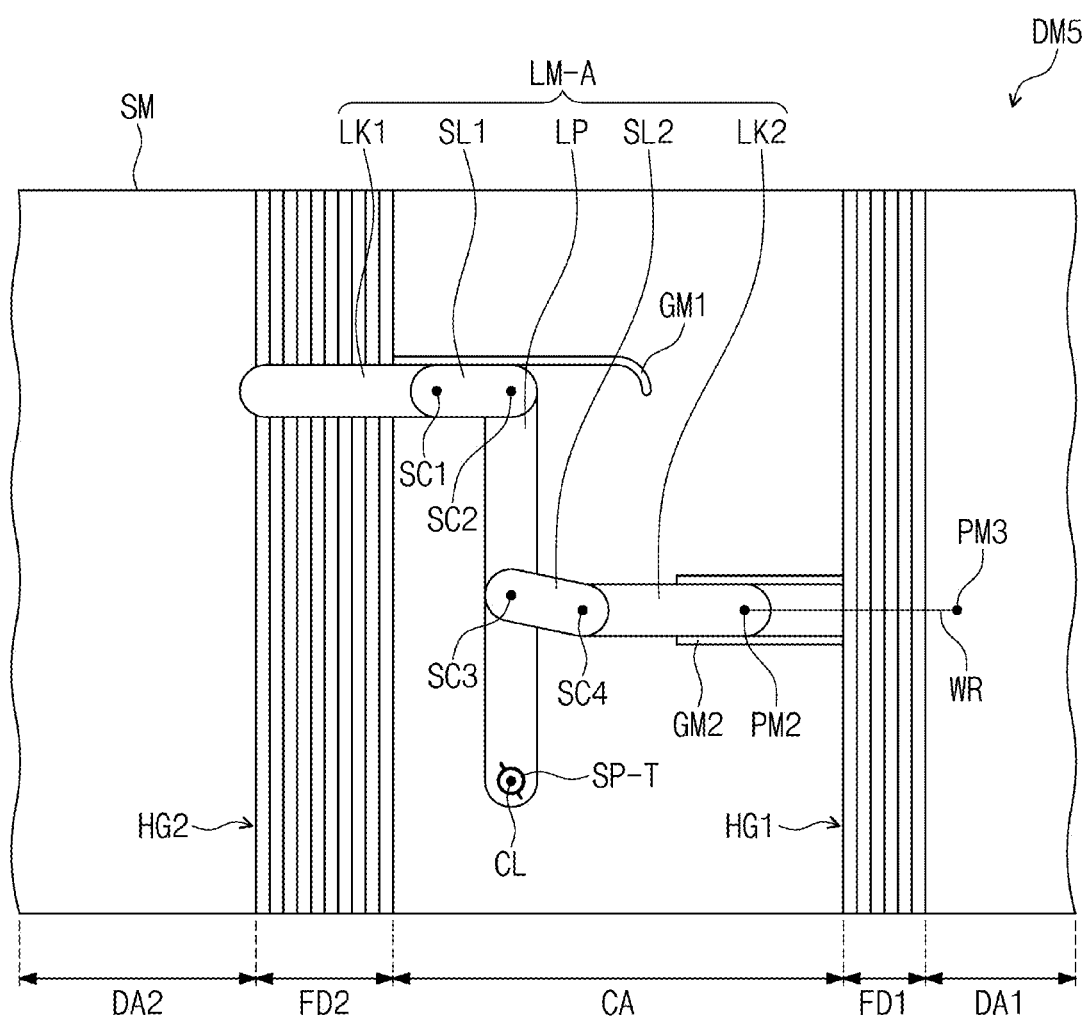
FIG. 10 is a plan view illustrating a display module according to another alternative embodiment of the invention.

FIG. 10 is a plan view illustrating a display module according to another alternative embodiment of the invention. Hereinafter, the same components as described with reference to FIGS. 1 to 4B, 9A and 9B will be indicated by the same reference designators, and the descriptions thereto will be omitted.

Another alternative embodiment of a display module DM5 may include an elastic part SP-T disposed between the rotation part LP and the second surface of the support member SM overlapping the central portion CA.

In such an embodiment, the elastic part SP-T may be a torsion spring. The elastic part SP-T may have stress in a direction opposite to a rotation direction of the elastic part SP-T in a process changed from the first state into the second state. In a process of unfolding the first folding portion FD1 and the second folding portion FD2 by a user, the first connection part LK1 may be easily returned to a position overlapping the second hinge portion HG2 by torque of the elastic part SP-T.

According to embodiments of the invention, the guide unit may be disposed under the display module including a plurality of the folding portions, and thus the folding order of the folding portions may be determined. In such embodiment, a folding operation of the folding portion having a relatively small radius of curvature may be performed prior to a folding operation of the folding portion having a relatively great radius of curvature, and thus the interference between the folding portions may be reduced to improve the reliability of the display device.

While the invention have been described with reference to example embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A display device comprising:
a display module including: a display panel including a front surface and a rear surface opposite to the front surface; and a support member including a first surface facing the rear surface of the display panel and a second surface opposite to the first surface; and
a guide unit disposed on the second surface of the support member,
wherein the display module includes: a first folding portion foldable with a radius of curvature; a second folding portion spaced apart from the first folding portion and foldable with a radius of curvature, which is equal to or greater than the radius of curvature of the first folding portion; a central portion disposed between the first and second folding portions; a first display portion spaced apart from the central portion with the first folding portion interposed therebetween; and a second display portion spaced apart from the central portion with the second folding portion interposed therebetween,
wherein the guide unit comprises:
a rotation part overlapping the central portion;
a first connection part connected to the rotation part;
a second connection part spaced apart from the first connection part and connected to the rotation part;
a wire part including a first end fixed to the first display portion and a second end fixed to the second connection part; and
an elastic part including a first end fixed to the second surface of the support member and a second end fixed to at least one part selected from the rotation part, the first connection part and the second connection part.

2. The display device of claim 1, wherein
the first folding portion is foldable about a first imaginary folding axis extending in a predetermined direction,
the first connection part overlaps the second folding portion in a first state in which the first folding portion is unfolded, and
the first connection part is spaced apart from the second folding portion in a second state in which the first folding portion is folded about the first imaginary folding axis.

3. The display device of claim 2, wherein
the second folding portion is foldable about a second imaginary folding axis extending in the predetermined direction, and
in the second state, the display module is in-folded in a way such that the second surface of the support member overlapping the first display portion overlaps the front surface of the display panel overlapping the second display portion.

4. The display device of claim 2, wherein
the second folding portion is foldable about a second imaginary folding axis extending in the predetermined direction, and
in the second state, the display module is out-folded in a way such that the second surface of the support member overlapping the central portion overlaps the second surface of the support member overlapping the second display portion.

5. The display device of claim 1, wherein
the first end of the elastic part is fixed to the second surface of the support member overlapping the second display portion, and
the second end of the elastic part is fixed to the first connection part.

6. The display device of claim 1, wherein
the first end of the elastic part is fixed to the second surface of the support member overlapping the central portion, and
the second end of the elastic part is fixed to the rotation part.

7. The display device of claim 1, wherein
the first end of the elastic part is fixed to the second surface of the support member overlapping the first display portion, and
the second end of the elastic part is fixed to the second connection part.

8. The display device of claim 1, further comprising:
a first sub-connection part connected to the first connection part and the rotation part; and
a second sub-connection part connected to the second connection part and the rotation part.

9. The display device of claim 1, further comprising:
wall parts which guide movement directions of the first and second connection parts.

10. The display device of claim 1, wherein the elastic part includes a compression spring or a tension spring.

11. The display device of claim 1, wherein
the elastic part is disposed between the rotation part and the second surface of the support member overlapping the central portion, and
wherein the elastic part includes a torsion spring having a constant torque.

12. The display device of claim 1, wherein each of the first and second folding portions includes a hinge.

13. A display device comprising:
a display module including: a first folding portion foldable with a radius of curvature about a first imaginary folding axis extending in a predetermined direction; a second folding portion foldable with a radius of curvature, which is equal to or greater than the radius of curvature of the first folding portion, about a second imaginary folding axis extending in the predetermined direction; a central portion disposed between the first and second folding portions; a first display portion spaced apart from the central portion with the first folding portion interposed therebetween; and a second display portion spaced apart from the central portion with the second folding portion interposed therebetween; and
a guide unit disposed under the display module, wherein the guide unit includes: a rotation part overlapping the central portion; a first connection part connected to the rotation part; and a second connection part spaced apart from the first connection part and connected to the rotation part,
wherein the first connection part overlaps the second folding portion in a first state in which the first folding portion is unfolded, and
wherein the first connection part is spaced apart from the second folding portion in a second state in which the first folding portion is folded about the first imaginary folding axis.

14. The display device of claim 13, wherein the display module comprises:
a display panel including a front surface and a rear surface opposite to the front surface; and a support member including a first surface facing the rear surface of the display panel and a second surface opposite to the first surface.

15. The display device of claim 14, wherein
the second folding portion is folded about the second imaginary folding axis extending in the predetermined direction, and
in the second state, the display module is in-folded in such a way that the second surface of the support member overlapping the first display portion overlaps the front surface of the display panel overlapping the second display portion.

16. The display device of claim 14, wherein
the second folding portion is folded about the second imaginary folding axis extending in the predetermined direction, and
in the second state, the display module is out-folded in such a way that the second surface of the support member overlapping the central portion overlaps the second surface of the support member overlapping the second display portion.

17. The display device of claim 14, wherein the guide unit further comprises:
a wire part including a first end fixed to the first display portion and a second end fixed to the second connection part; and
an elastic part including a first end fixed to the second surface of the support member and a second end fixed to at least one of the rotation part, the first connection part, or the second connection part.

18. The display device of claim 17, wherein
the first end of the elastic part is fixed to the second surface of the support member overlapping the second display portion, and
wherein the second end of the elastic part is fixed to the first connection part.

19. The display device of claim 17, wherein
the first end of the elastic part is fixed to the second surface of the support member overlapping the central portion, and
wherein the second end of the elastic part is fixed to the rotation part.

20. The display device of claim 17, wherein
the first end of the elastic part is fixed to the second surface of the support member overlapping the first display portion, and
wherein the second end of the elastic part is fixed to the second connection part.

21. The display device of claim 13, further comprising:
a first sub-connection part connected to the first connection part and the rotation part; and
a second sub-connection part connected to the second connection part and the rotation part.

* * * * *